(12) United States Patent
Becker et al.

(10) Patent No.: US 7,938,058 B2
(45) Date of Patent: May 10, 2011

(54) ENGINE PISTON WITH ROLLING ELEMENT SKIRT

(75) Inventors: Edward P. Becker, Brighton, MI (US);
Emerson J. Adams, Sterling Heights, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 488 days.

(21) Appl. No.: 12/103,723

(22) Filed: Apr. 16, 2008

(65) Prior Publication Data

US 2009/0260517 A1    Oct. 22, 2009

(51) Int. Cl.
*F16J 1/02* (2006.01)
*F16C 29/04* (2006.01)

(52) U.S. Cl. ......................................... 92/178; 92/227

(58) Field of Classification Search .................... 92/178, 92/225, 227
See application file for complete search history.

(56) References Cited

U.S. PATENT DOCUMENTS

| | | | | | |
|---|---|---|---|---|---|
| 1,752,816 | A | * | 4/1930 | Sologaistoa | 92/178 |
| 3,327,593 | A | * | 6/1967 | Ciaccia | 92/178 |
| 3,398,653 | A | * | 8/1968 | Foster | 92/178 |
| 4,485,728 | A | * | 12/1984 | Bando | 92/178 |
| 4,704,949 | A | * | 11/1987 | Foster | 92/178 |
| 5,437,220 | A | * | 8/1995 | Cheng et al. | 92/178 |
| 5,615,600 | A | * | 4/1997 | Cheng et al. | 92/178 |

* cited by examiner

*Primary Examiner* — Thomas E Lazo

(57) ABSTRACT

The present invention utilizes rolling elements, such as balls or rollers acting as bearings carried in openings in the skirt or equivalent portion of a piston, to engage the cylinder walls and replace the sliding bearings of the skirt with the roller elements in the skirt. The rolling elements then absorb all or some of the thrust loads conventionally absorbed by the skirt walls sliding along surfaces of an associated cylinder and thereby reduce the friction forces developed by the reciprocating action of the piston skirt.

11 Claims, 5 Drawing Sheets

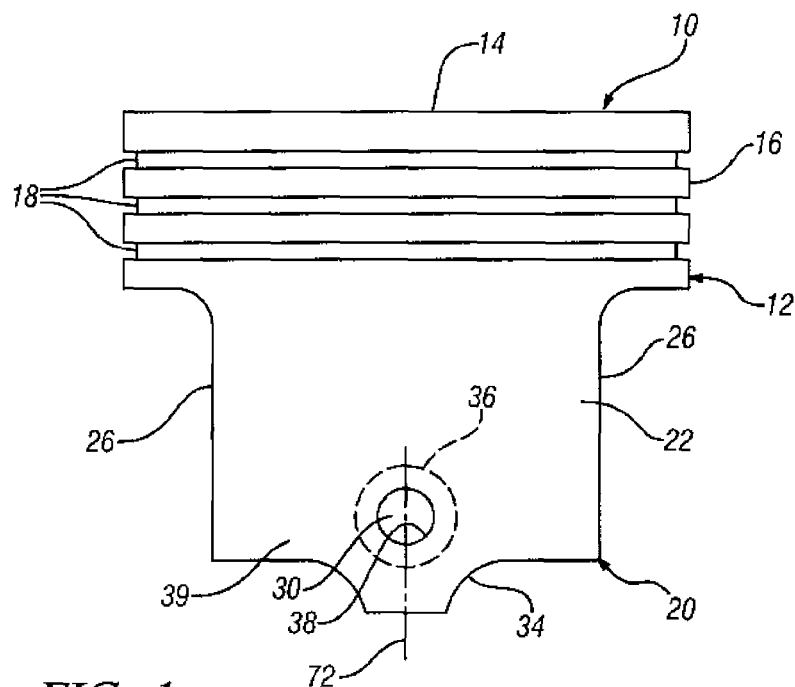
FIG. 1
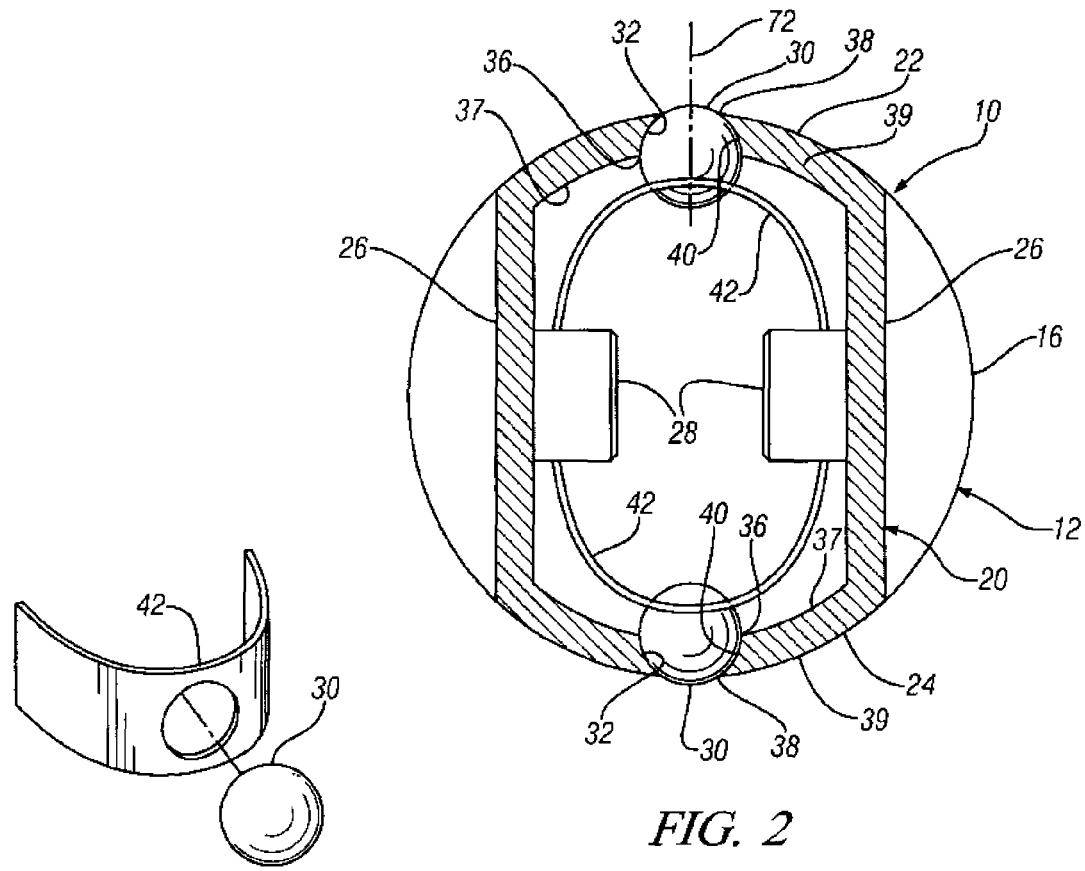
FIG. 2A
FIG. 2

US 7,938,058 B2

ENGINE PISTON WITH ROLLING ELEMENT SKIRT

TECHNICAL FIELD

This invention relates to pistons for reciprocating piston engines and particularly to rolling element means for absorbing side thrust.

BACKGROUND OF THE INVENTION

It is known in the art relating to reciprocating piston engines, such as internal combustion engines, to provide a piston having a head for absorbing combustion loads and a skirt for guiding the piston in a cylinder and absorbing side thrust loads. The piston head generally includes seal means, such as grooves for retaining piston rings for controlling blow-by of combustion gases and leakage of lubricating oil into an associated engine combustion chamber.

Both the piston rings and the piston skirt have outer surfaces that slide along the cylinder wall with lubrication to provide long life. However, the sliding surfaces cause a substantial portion of the friction losses normally occurring in an engine. Reduction of engine friction losses is a direct method of increasing engine efficiency and improving the mileage of automotive vehicles equipped with higher efficiency engines.

SUMMARY OF THE INVENTION

The present invention utilizes rolling elements, such as balls or rollers acting as bearings carried in openings in the skirt or equivalent portion of a piston, to engage the cylinder walls and replace the sliding bearings of the skirt with the roller elements in the skirt. The rolling elements then absorb all or some thrust forces conventionally absorbed by the skirt walls sliding along surfaces of an associated cylinder and thereby reduce the friction forces developed by the reciprocating action of the piston skirt.

These and other features and advantages of the invention will be more fully understood from the following description of certain specific embodiments of the invention taken together with the accompanying drawings.

DESCRIPTION OF THE DRAWINGS

FIG. 1 is a side view of a first embodiment of an internal combustion engine piston having a ball rolling element for transmitting side thrust forces to a piston skirt;

FIG. 2 is a bottom view of the piston of FIG. 1 showing one ball rolling element for each skirt portion; FIG. 2A is an exploded pictorial view illustrating the relationship of the ball rolling element retained within an opening in a retainer;

DESCRIPTION OF AN EXEMPLARY EMBODIMENT

Figure 3:
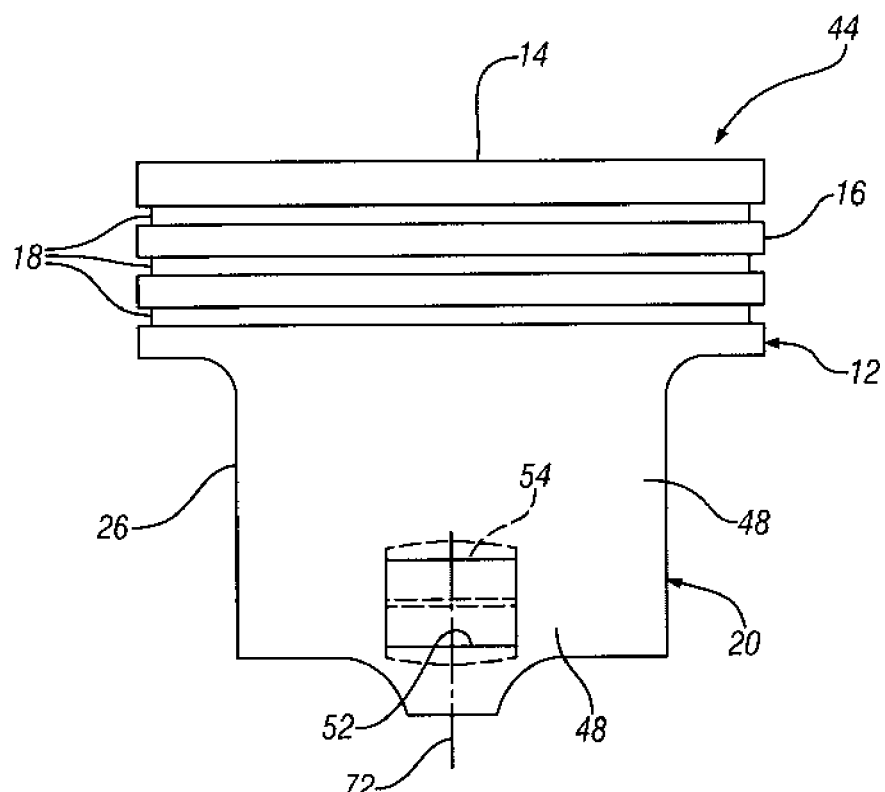
FIGS. 3 and 4 are views similar to FIGS. 1 and 2 showing a second piston embodiment wherein the rolling elements are barrel shaped rollers.

Referring first to FIGS. 1 and 2 of the drawings in detail, numeral 10 generally indicates a first embodiment of a piston including a head 12 having a crown or head end 14 and a generally circular periphery 16 with one or more ring grooves 18 for receiving compression and/or oil control rings, not shown. In use, the head 12 is exposed to compression and combustion pressures and temperatures occurring in an associated engine cylinder, not shown.

Depending from the head is a skirt 20, which may be formed as a continuous wall including diametrically opposite part cylindrical thrust and anti-thrust portions 22, 24, adapted to be positioned in use in close opposition to the bore of the associated engine cylinder, not shown, for transmitting side thrust forces from the piston against the associated cylinder. The skirt may also include sidewall portions 26, which may continue the cylindrical skirt configuration or may be generally flat, extending from the head and connecting between the cylindrical sidewall portions. The sidewall portions 26 may include piston pin bosses 28, extending inward toward one another with space for receiving a connecting rod, not shown, between them, the bosses having bores, not shown, adapted to receive a piston pin, not shown, for connecting the piston with the connecting rod in known fashion. Alternatively, the piston pin bosses may extend directly from the head with, or separately from, the piston skirt.

In a conventional engine piston, the skirt acts as a bearing, sliding against the bore of the associated cylinder and lubricated by the engine lubricating oil. In a piston according to the present invention, the piston includes at least one rolling element, which may be mounted in the skirt or in an appendage serving the functions of a skirt although it may be different in appearance. In the present description, the term skirt is intended to include configurations acting as a skirt, regardless of their differing shapes.

In the first embodiment of FIGS. 1 and 2, the piston 10 includes two rolling elements in the form of spherical balls 30 made of any suitable material, such as steel or ceramic. The balls are received in openings 32 centered near lower edges 34 of the skirt portions 22, 24. The openings 32 have conical or part-spherical cross sections with their larger diameters 36 opening through inner sides 37 of the skirt portions and their smaller diameters 38 opening through outer sides 39 of the skirt portions. The openings thereby form open bottom cups 40 in which the balls 30 are retained with a smaller portion of each ball projecting from its opening to the exterior of the skirt where it is adapted to engage the inner surface of an associated engine cylinder.

The balls are held in place by one or more suitable retainers formed or mounted in the interior of the piston skirt. The retainers may loosely engage or resiliently urge the balls into their respective cups 40 to engage the cylinder and thus cause the balls to transfer piston side thrust forces directly to the cylinder bore with a rolling action as the piston reciprocates in the cylinder. The retainers may be of any suitable form having sufficient strength to transmit the thrust forces to the cylinder. Alternatively, the balls could transfer only a portion of the thrust forces and the piston skirt could also engage the cylinder during higher thrust forces and transfer excess thrust forces to the cylinder directly through the skirt.

In FIG. 2, the retainer is represented by a flat spring 42 secured to the pin bosses 28 and engaging the balls 30 within the skirt to urge the balls into their cups 40 and against the cylinder bore, not shown. The retainers 42 may be provided with an opening for receiving each ball, as shown in FIG. 2A. Alternatively, the ball could ride in a recess or pocket in the spring. Engagement with each ball deflects the resilient spring inwardly and generates the force necessary to transmit the thrust forces to the cylinder.

In the case of solid retainers, not shown, fixed within the piston skirt, the ball 30, on the side against which thrust was directed at any particular moment, would engage the retainer and transfer the thrust directly by a sliding motion against the retainer and a rolling motion along the cylinder. Accordingly, retainers of any type may need to have surfaces made of long wearing or low friction material, such as aluminum bearing metal or PTFE (polytetrafluoroethelene), to provide extended piston life with reduced wear by reduction of friction from the motion of the piston.

If desired, the cups 40 forming the piston openings could be made as separate inserts fixed within the piston from the inside or held in place at least partially by the retainer of the rolling element, of whatever type.

Figure 4:
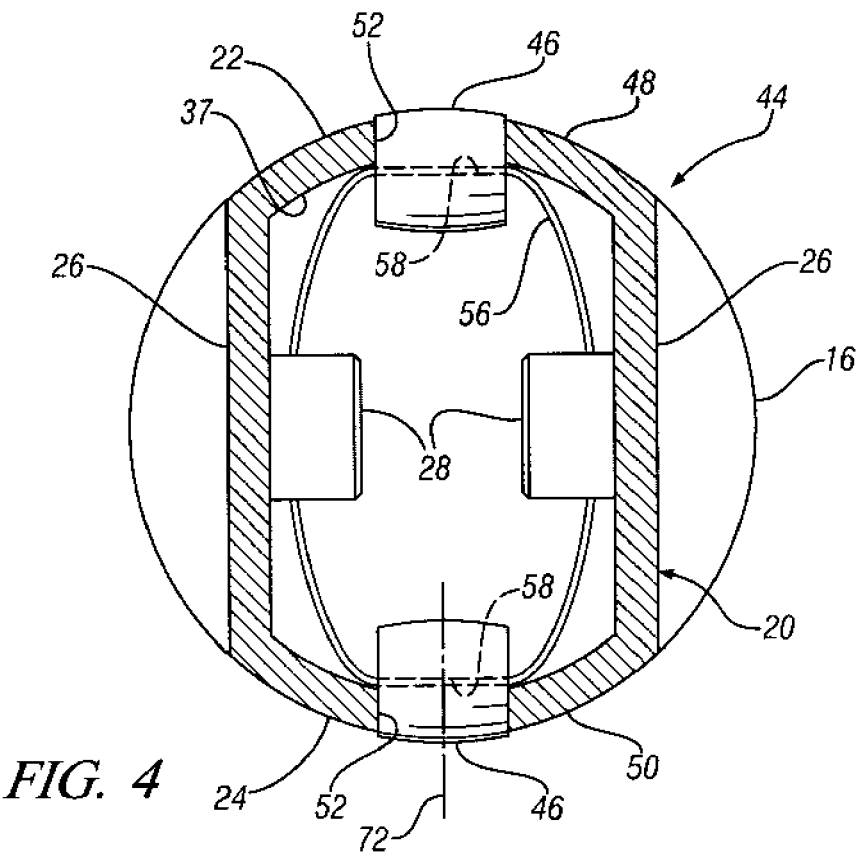

FIGS. 3 and 4, show a second embodiment of piston 44, similar to piston 10 of FIGS. 1 and 2, in which like numerals indicate like parts or features. Thus, the head 12 and its features and the skirt 20 and its features are generally similar to those of the piston 10 and are identified by like reference numerals. Differences are in the rolling elements, which may be barrel rollers 46 shaped to conform to the inner diameter of the associated cylinder, not shown. Also, the thrust and anti-thrust portions 48, 50 of the piston skirt have openings 52 of rectangular form in which the rollers 46 are received and the openings have curved or angled faces 54 by which the rollers are guided.

The retainer for the rollers 46 may be a wire spring 56 made in one or two pieces and fixed to the pin bosses 28. The rollers may have axial openings 58 through which the wire spring extends to exert thrust force on the rollers and transmit the thrust forces from the skirt to the associated cylinder.

Figure 5:
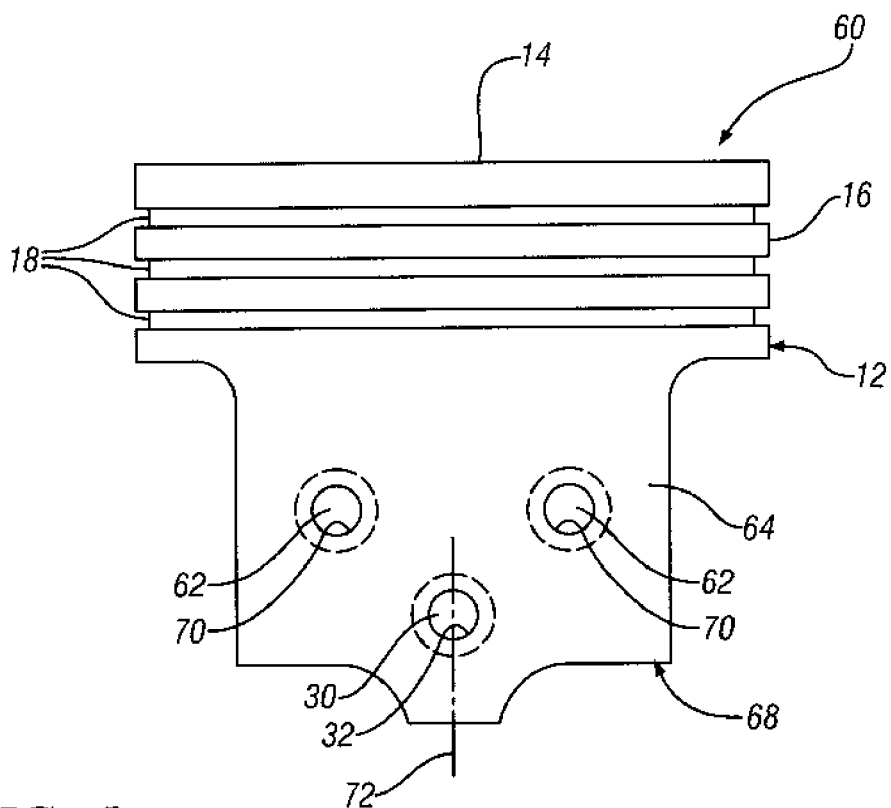
FIGS. 5 and 6 are views similar to FIGS. 1 and 2 showing a third piston embodiment including multiple ball rolling elements in each piston skirt.
Figure 6:
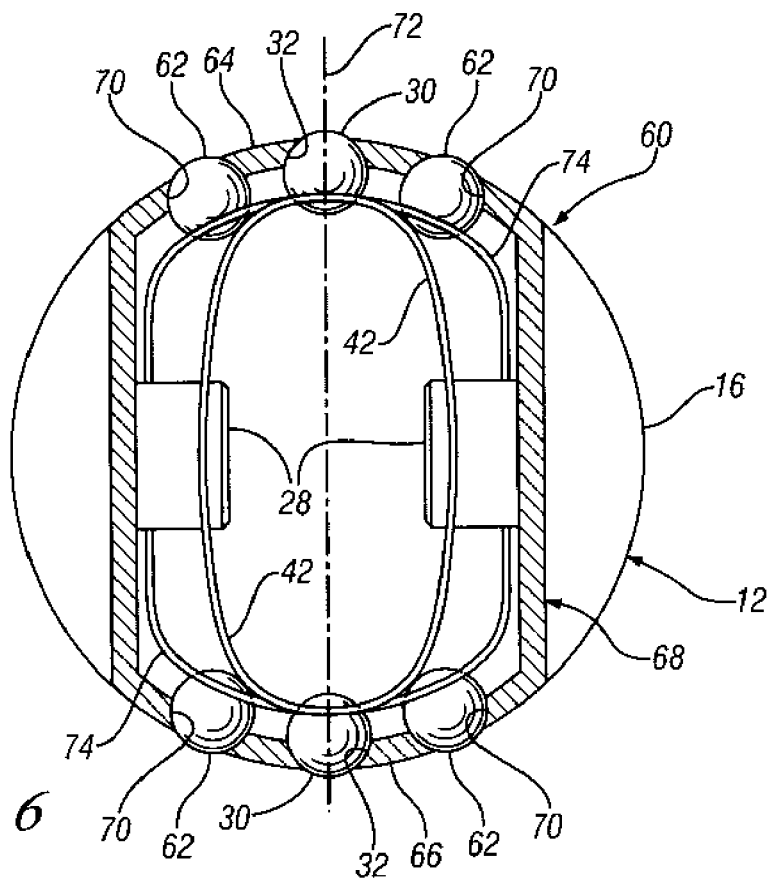

FIGS. 5 and 6 show a third embodiment of piston 60, similar to piston 10 of FIGS. 1 and 2 and in which like numerals indicate like parts or features. Thus, the head 12 and its features and the skirt 20 and its features are generally similar to those of the piston 10 and use like reference numerals. The rolling elements are balls 30 as in the first embodiment.

Differences are limited to the addition of two additional balls 62 in each of the thrust and anti-thrust portions 64, 66 of the skirt 68 modified to provide additional openings 70 for the balls 62 located higher on the skirt portions and spaced equally on either side of a central plane 72 extending diametrically between the balls 62 at the lower ends of the skirt portions 64, 66. The higher balls 62 are held in place by a second flat spring retainer 74 located above retainer 42 to maintain the higher balls 62 in their respective openings 70.

Figure 7:
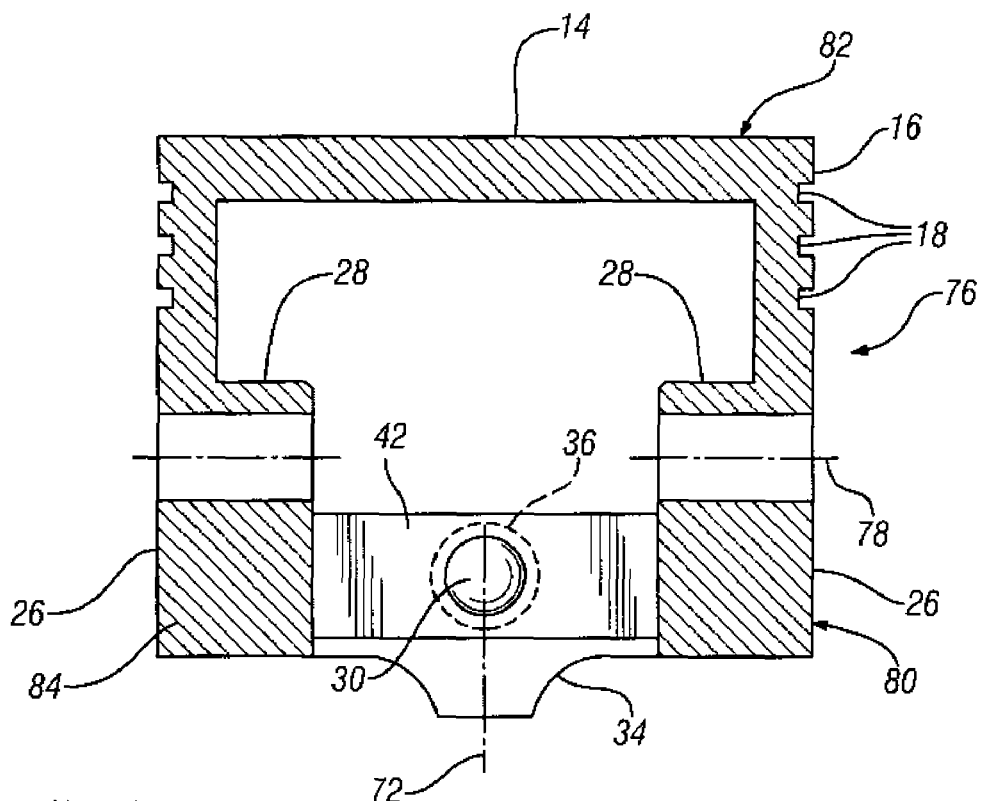
FIG. 7 is a cross-sectional view in the plane of the piston pin boss showing the interior of a fourth piston embodiment with a single ball rolling element and a retainer on the thrust side of a piston skin.
Figure 8:
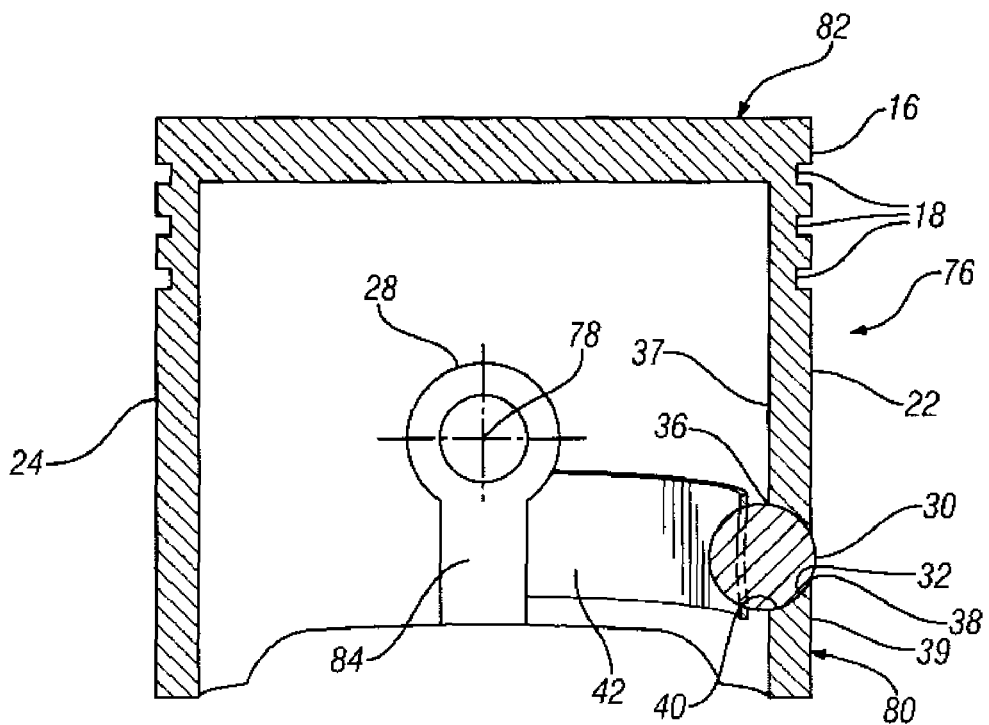
FIG. 8 is a cross-sectional interior view of the piston of FIG. 7 taken across the plane of the piston pin boss and showing a spring ball retainer.

FIGS. 7 and 8 show a fourth embodiment of piston 76, which is similar in many ways to the piston 10 of the first embodiment. However the cross-sectional views of FIG. 7 along the piston pin axis 78 and of FIG. 8 across the pin axis 78 show that the piston skirt 80 is generally cylindrical like the head 82 rather than flat sided as in the piston 10. This difference is of interest in showing that the features of the present invention can be applied to either form of piston skirt.

The piston 76 differs from piston 10 primarily in utilizing a single ball 30 rolling element applied to only the thrust portion 22 of the piston skirt. The thrust portion refers generally to that part of a piston skirt which receives the higher thrust forces on a piston, usually occurring during and after combustion on the expansion stroke of the piston. This piston embodiment 76 is applicable where the compression thrust forces are low enough as not to benefit from a rolling element in the anti-thrust skirt portion sufficiently to warrant adding the feature to the piston.

Thus, the piston includes a single flat spring 42 urging the single ball 30 against the single opening 32 in the skirt thrust portion 22. The spring 42 is retained by engagement with wall portions 84 depending from the pin bosses 28 and biases the single ball of piston 76 in the same manner as the spring 42 of piston 10 biases the two balls of piston 10.

Figure 9:
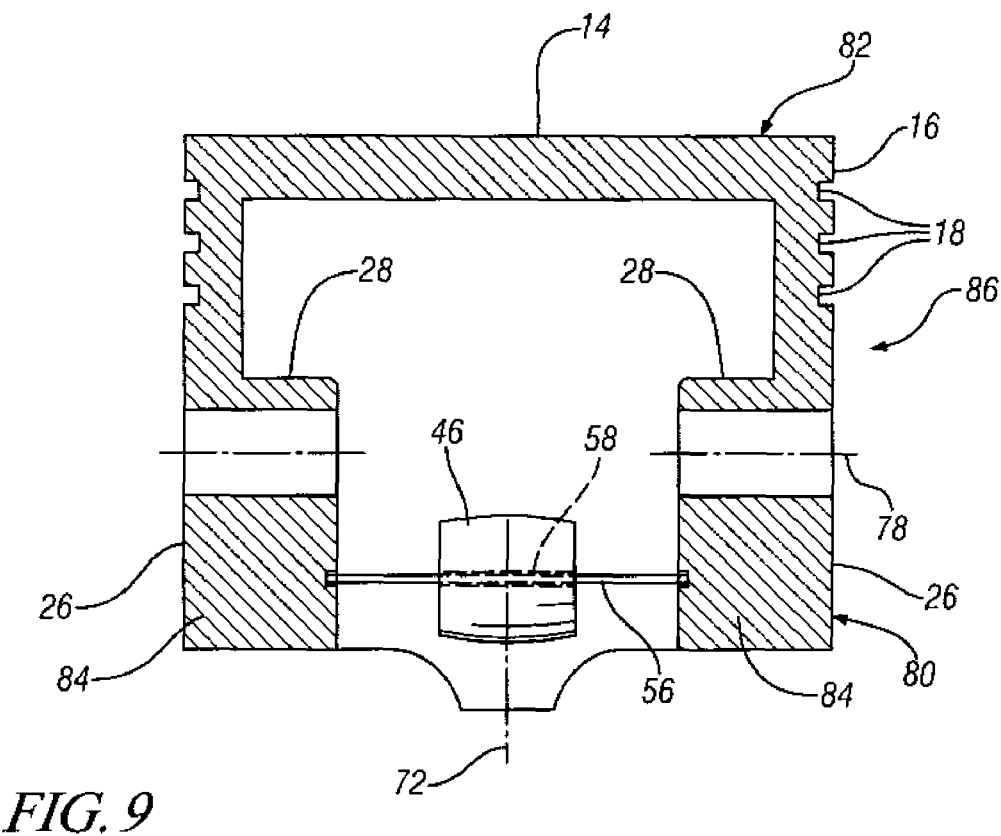
FIG. 9 is a view similar to FIG. 7 but showing a piston with a single barrel roller element.
Figure 10:
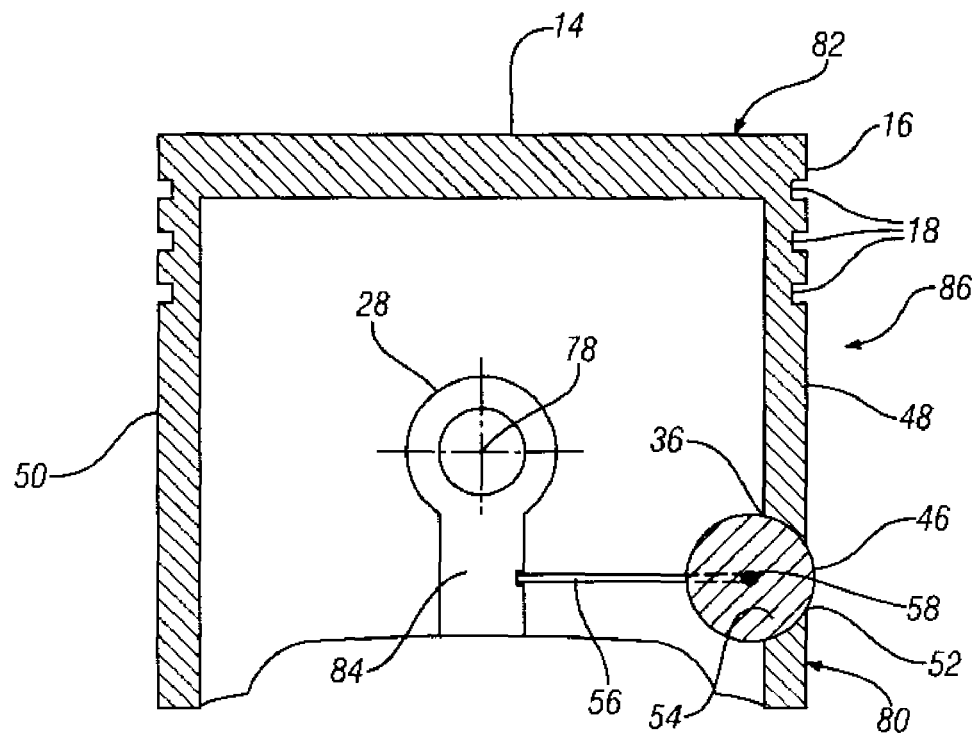
FIG. 10 is a view similar to FIG. 8 showing the piston of FIG. 9 with a wire roller retainer.

FIGS. 9 and 10 show a fifth embodiment of piston 86, which is similar in many ways to the piston 44 of the second embodiment. However the cross-sectional views show a generally circular skirt as in the fourth embodiment piston 76. Piston 86 is similar to piston 44 of the second embodiment in the use of a barrel type roller 46 in place of the ball roller 30 of piston 76 (FIGS. 7 and 8). The barrel roller 46 and the wire spring 56 are similar to those features in the second embodiment piston 44 and operate in the same manner to carry the major thrust forces to the associated cylinder as previously described.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A piston for an internal combustion engine comprising:
a head for withstanding compression and combustion forces and a skirt depending from the head and including opposite thrust and anti-thrust sides;
at least one rolling thrust element rotatably received in at least a thrust side of the skirt and protruding through an opening in an outer surface of the skirt for engagement of the rolling element with an associated cylinder; and
retainer means in the piston and supporting at least one rolling element for rotation in the opening upon reciprocation of the piston in the cylinder, the retainer positioned to absorb side thrust forces acting on the rolling element from engagement with the cylinder, and the retainer means being made of a bearing material that is an aluminum-based material.

2. A piston as in claim 1 wherein the piston includes at least one rolling thrust element rotatably received in the anti-thrust side of the skirt and protruding through an opening in an outer surface of the skirt for engagement of the rolling element with the associated cylinder.

3. A piston as in claim 1 wherein the head has a cylindrical periphery including annular piston ring grooves and the thrust and anti-thrust sides of the skirt are at least partially cylindrical.

4. A piston as in claim 2 wherein the rolling thrust element is a bearing ball.

5. A piston as in claim 2 wherein the rolling thrust element is a bearing roller.

6. A piston as in claim 5 wherein the bearing roller is barrel shaped.

7. A piston as in claim 1 wherein the piston includes at least one piston pin boss and the retainer means are supported by said at least one piston pin boss.

8. A piston as in claim 1 wherein the material of the rolling thrust element is one of steel and ceramic.

9. A piston as in claim 1 wherein there are multiple rolling thrust elements on at least the thrust side of the piston skirt.

10. A piston as in claim 1 wherein a single rolling element positioned on one of the thrust and anti-thrust sides of the skirt is located in a plane of greatest side thrust of the piston skirt against an associated cylinder.

11. A piston as in claim 1 wherein a single rolling element in a side of the skirt is located near a bottom edge of the skirt to minimize thrust loading of the rolling element.

* * * * *